(12) United States Patent
McDaniel et al.

(10) Patent No.: US 10,331,357 B2
(45) Date of Patent: Jun. 25, 2019

(54) TRACKING STORES AND LOADS BY BYPASSING LOAD STORE UNITS

(71) Applicant: Advanced Micro Devices, Inc., Sunnyvale, CA (US)

(72) Inventors: Betty Ann McDaniel, Austin, TX (US); Michael D. Achenbach, Austin, TX (US); David N. Suggs, Austin, TX (US); Frank C. Galloway, Austin, TX (US); Kai Troester, Boxborough, MA (US); Krishnan V. Ramani, Sunnyvale, CA (US)

(73) Assignee: ADVANCED MICRO DEVICES, INC., Sunnyvale, CA (US)

( * ) Notice: Subject to any disclaimer, the term of this patent is extended or adjusted under 35 U.S.C. 154(b) by 53 days.

(21) Appl. No.: 15/380,778

(22) Filed: Dec. 15, 2016

(65) Prior Publication Data
US 2018/0052613 A1    Feb. 22, 2018

Related U.S. Application Data

(60) Provisional application No. 62/377,301, filed on Aug. 19, 2016.

(51) Int. Cl.
*G06F 3/06*      (2006.01)
*G06F 12/0871*   (2016.01)
*G06F 12/0897*   (2016.01)
*G06F 9/30*      (2018.01)

(52) U.S. Cl.
CPC .......... *G06F 3/0611* (2013.01); *G06F 3/0631* (2013.01); *G06F 3/0643* (2013.01); *G06F 3/0659* (2013.01); *G06F 3/0673* (2013.01); *G06F 9/30* (2013.01); *G06F 12/0871* (2013.01); *G06F 12/0897* (2013.01);
(Continued)

(58) Field of Classification Search
CPC .... G06F 3/0611; G06F 3/0631; G06F 3/0643; G06F 3/0659; G06F 3/0673; G06F 12/0871; G06F 12/0897; G06F 2212/1024; G06F 2212/304; G06F 2212/463; G06F 2212/604
See application file for complete search history.

(56) References Cited

U.S. PATENT DOCUMENTS

| 9,164,900 B1 | 10/2015 | Schuttenberg |
| 2003/0056089 A1* | 3/2003 | Senter ................... G06F 9/3004 712/225 |
| 2005/0149702 A1 | 7/2005 | Hily et al. |

(Continued)

*Primary Examiner* — Francisco A Grullon
(74) *Attorney, Agent, or Firm* — Volpe and Koenig, P.C.

(57) ABSTRACT

A system and method for tracking stores and loads to reduce load latency when forming the same memory address by bypassing a load store unit within an execution unit is disclosed. The system and method include storing data in one or more memory dependent architectural register numbers (MdArns), allocating the one or more MdArns to a MEMFILE, writing the allocated one or more MdArns to a map file, wherein the map file contains a MdArn map to enable subsequent access to an entry in the MEMFILE, upon receipt of a load request, checking a base, an index, a displacement and a match/hit via the map file to identify an entry in the MEMFILE and an associated store, and on a hit, providing the entry responsive to the load request from the one or more MdArns.

20 Claims, 5 Drawing Sheets

(52) U.S. Cl.
    CPC ............... *G06F 2212/1024* (2013.01); *G06F 2212/304* (2013.01); *G06F 2212/463* (2013.01); *G06F 2212/604* (2013.01)

(56) References Cited

U.S. PATENT DOCUMENTS

| | | |
|---|---|---|
| 2006/0107021 A1 | 5/2006 | Barrick et al. |
| 2009/0240919 A1* | 9/2009 | Alexander .......... G06F 9/30043 712/214 |
| 2014/0337581 A1 | 11/2014 | Meier |
| 2015/0309792 A1* | 10/2015 | Meier ................. G06F 9/30043 712/225 |

* cited by examiner

_US 10,331,357 B2_

TRACKING STORES AND LOADS BY BYPASSING LOAD STORE UNITS

CROSS REFERENCE TO RELATED APPLICATION

This application claims the benefit of U.S. Provisional Application No. 62/377,301 filed Aug. 19, 2016, which is incorporated by reference as if fully set forth.

BACKGROUND

Present computer systems provide loads and stores for memory access using load queues and store queues. Generally, these systems operate using store-to-load forwarding. However, store-to-load forwarding fails to provide the lowest latency solution for situations where the loads and stores are directed to the same address.

BRIEF DESCRIPTION OF THE DRAWINGS

A more detailed understanding can be had from the following description, given by way of example in conjunction with the accompanying drawings wherein.

DETAILED DESCRIPTION

Memory renaming is a way of tracking stores and loads to the same address and bypassing a load store unit when a load follows an associated store. This scenario can happen frequently. As an example, memory renaming is needed when a program stores data via a store queue, performs other processing, then loads the same data via a load queue. This load follows an associated store. Programs often seek to load data that has recently been stored.

A system and method for tracking stores and loads by bypassing a load store unit is disclosed. The system and method include storing data in one or more memory dependent architectural register numbers (MdArns). The one or more MdArns are allocated to an in-memory file cache (MEMFILE). The allocated one or more MdArns are written to a map file, wherein the map file contains a MdArn map to enable subsequent access to an entry in the MEMFILE. Upon receipt of a load request, checking a base, an index, a displacement and a match/hit via the map file to identify an entry in the MEMFILE and an associated store. On a hit, providing the entry responsive to the load request from the one or more MdArns.

Figure 1:
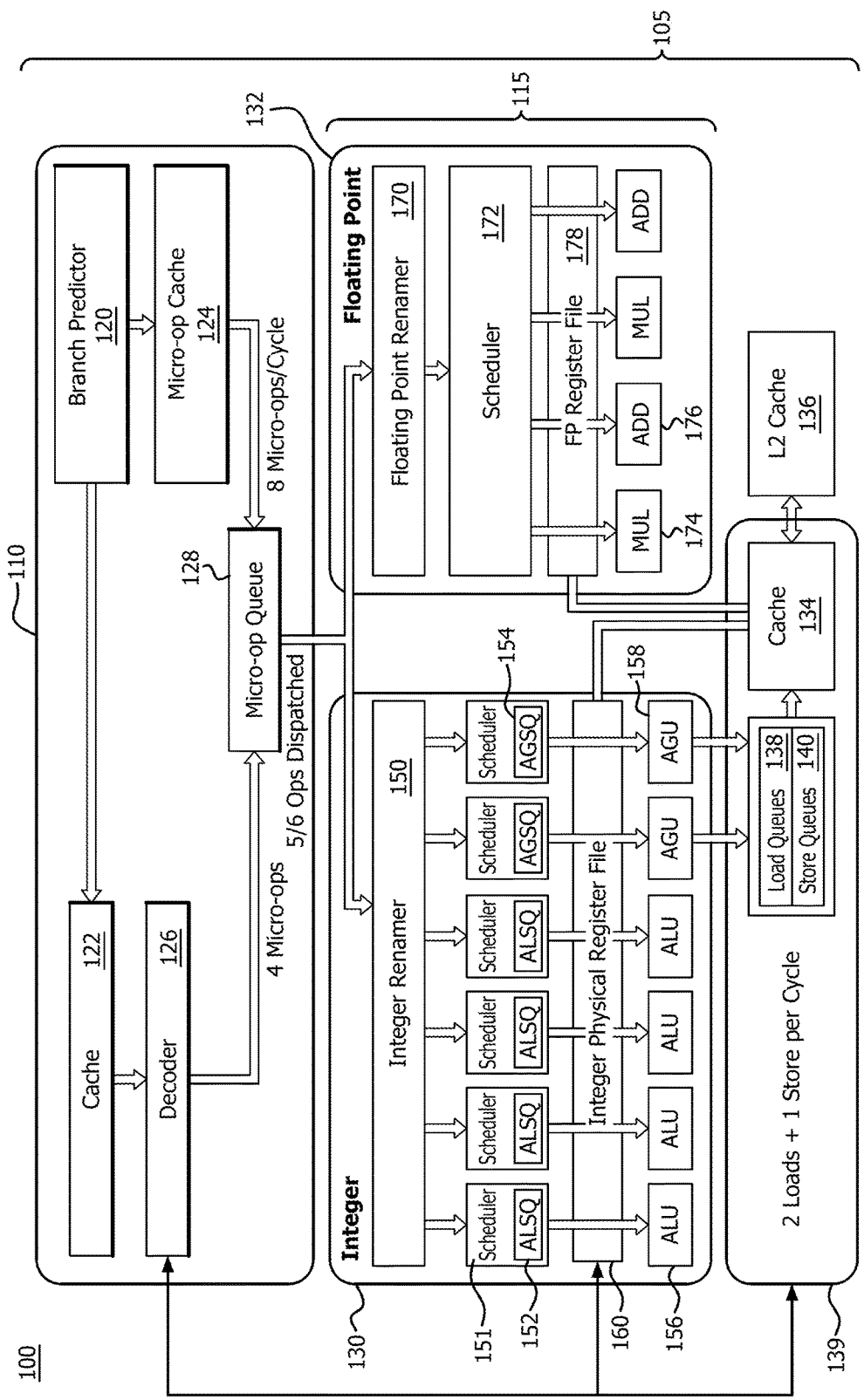
FIG. 1 illustrates a core processing unit of a processor in accordance with certain implementations.

FIG. 1 is a high level block and flow diagram of a core processing unit 105 of a processor 100 in accordance with certain implementations. The core processing unit 105 includes, but is not limited to, a decoder unit 110 which provides micro operations (micro-ops) to a scheduler and/or execution unit 115. The decoder unit 110 includes, but is not limited to, a branch predictor 120 connected to a cache 122 and a micro-op cache 124. The cache 122 is further connected to a decoder 126. The decoder 126 and the micro-op cache 124 are connected to a micro-op queue 128.

The scheduler and/or execution unit 115 includes, but is not limited to, an integer scheduler and/or execution unit 130 and a floating point scheduler and/or execution unit 132, both of which are connected to a cache 134. The cache 134 is further connected to an L2 cache 136, load queues 138, and store queues 140. Load queues 138, store queues 140, and cache 134 are collectively referred to as load store (LS) unit 139.

The integer scheduler and/or execution unit 130 includes, but is not limited to, an integer renamer 150 which is connected to a scheduler 151, which includes arithmetic logic unit (ALU) schedulers (ALSQs) 152 and address generation unit (AGUs) schedulers (AGSQs) 154. The scheduler 151, and in particular the ALSQs 152 and AGSQs 154, are further connected to ALUs 156 and AGUs 158, respectively. The integer scheduler and/or execution unit 130 also includes an integer physical register file 160.

The floating point scheduler and/or execution unit 132 includes, but is not limited to, a floating point renamer 170 which is connected to a scheduler 172. The scheduler 172 is further connected to multipliers 174 and adders 176. The floating point scheduler and/or execution unit 132 also includes a floating point physical register file 178.

A pipelined processor requires a steady stream of instructions to be fed into the pipeline. The branch predictor 120 predicts which set of instructions should be fetched and executed in the pipelined processor. These instructions are fetched and stored in cache 122, and when read from cache 122 are decoded into operations by the decoder 126. A micro-op cache 124 caches the micro-ops as the decoder 126 generates them. The micro-op queue 128 stores and queues up the micro-ops from the decoder 126 and micro-op cache 124 for dispatching the micro-ops for execution.

In conventional pipeline processing, a micro-op queue dispatches certain operations, such as load or store operations, directly to a load queue and/or a store queue that holds the payloads, such as control information decoded from the operation, and memory addresses associated with the micro-ops. For purposes of illustration, the store queue may accept a plurality of operations, from the micro-op queue and write the payload into the store queue at dispatch time. At address generation time, the store queue then receives a queue index from a scheduler to specify which store entry is being processed. The scheduler reads out the dispatch payload, and sends it to segmentation logic for segmentation checks, and to a load queue for a possible pick on the micro-op pipeline. That is, conventional pipeline processing is a two pass write process with respect to the store and load queues; once at dispatch for the payload and again at address generation to generate the address in memory.

In accordance with an implementation, the micro-ops are dispatched to the integer scheduler and/or execution unit 130 and the floating point scheduler and/or execution unit 132 only, instead of directly writing to the load queues 138 and store queues 140 as per the conventional pipeline processing. In particular, the micro-ops are directed to: (1) the scheduler 151 via the integer renamer 150; and (2) the scheduler 172 via the floating point renamer 170. The scheduler 151 holds all of the dispatch payloads for the micro-ops (e.g., the dispatch payloads for the store micro-ops) in the AGSQ 154. That is, the AGSQ 154 holds the micro-ops (e.g., the load and store micro-ops), until a queue entry in the appropriate load queues 138 and/or store queues 140 is available. Once a queue entry is available and the sources for the physical register file 160 are ready, the AGSQ 154 generates the address, reads the dispatch payload and sends the dispatch payload to the load queues 138 and/or store queues 140.

In order to maintain age-ordered operation or in-order queues, every store micro-op is associated with a particular queue entry or queue identifier. In particular, the scheduler 151 needs to know when the AGSQ 154 can perform address generation and when the scheduler 151 can send the stored data (i.e., the dispatch payload) to the store queue 140. Accordingly, a particular queue is communicated by the store queue 140 to the AGSQ 154 when the particular queue is available. While this communication chain is not specifically shown in FIG. 1, this communication is provided as a general matter.

The load queues 138 and store queues 140 send the scheduler 151 (AGSQ 154 and ALSQ 152) a commit-deallocation signal so that the scheduler 151 (AGSQ 154 and ALSQ 152) can update its oldest store micro-op store queue index to enable address generation or to send store data for younger store micro-ops as those older store micro-ops deallocate and free up their respective store queue entries. This can be implemented, for example, by adding an output (not shown) from the load queues 138 and store queues 140 to an input at the scheduler 151 (AGSQ 154 and ALSQ 152).

By holding all dispatch information in the AGSQ 154 and delaying store queue allocation until address generation time (e.g., storing data for store micro-ops whose store queue entry is still in use by the previous store micro-op), more store micro-ops can be dispatched than the store queue 140 size. By eliminating the source of dispatch stalls, further micro-ops can be introduced in the window and allowed to start their work. Any store micro-ops will not be able to get started until the previous store in their store queue entry deallocates, but other micro-ops can proceed. This allows for loads that may be cache misses to dispatch and/or perform address generation in order to start the cache miss.

Support for handling a greater number of stores in the window than there are store queue entries necessitates a way to compare the age of micro-ops. The way to compare the age of the micro-ops is provided by using the store queue entry number associated with the micro-op as well as "wrap" bits that accompany the store queue entry number. The wrap bits determine which "epoch" of the store queue entry the associated store micro-ops will use. A single wrap bit provides a way to track two different "wraps" or "epochs" of the store queue, which enables dispatching the full store queue (XC_STQDEPTH). When more store micro-ops are allowed to dispatch than store queue entries, there can be micro-ops in the window with the same store queue entry, but from multiple different "wraps" or "epochs" of the store queue. One additional wrap bit, for a total of two wrap bits, provides a way to track four different "wraps" or "epochs" of the store queue, which enables dispatching up to three times the store queue depth.

In an illustrative example, if the implemented architecture has a store queue depth of 44 and there are two 14-entry AGSQs (for up to 28 additional micro-op stores at address generation), then there are a total of 72 stores that are able to be dispatched in the window. Accordingly, the processor will not dispatch more than twice the store queue depth. Two wrap bits are sufficient to track and compare the age of all 72 stores in the machine, and no dispatch stall is needed. The wrap bits are computed at dispatch and are held in the AGSQ payload. If the AGSQ scheduler depth allows dispatch of stores more than three times the store queue depth, additional wrap bits could be added to enable an arbitrary number of stores to dispatch.

The load micro-ops are not necessarily age-ordered and can use other techniques known to those skilled in the art to control execution order of the instructions. In an implementation, the load micro-ops can operate similarly to the store micro-ops.

From an architecture perspective, the implementations described herein solve the issues outlined above. First, the number of dispatch payload write ports can be reduced in the store queue. For example, the number of dispatch payload write ports can be reduced from four (four stores per cycle at dispatch) to two (two store address generations per cycle). Second, difficult timing paths are eliminated. For example, the timing path that involved sending the queue index to the store queue, reading out the payload and then sending the payload to the segmentation logic and load queue is eliminated.

Once address generation is performed by the AGSQs 154 and the data/dispatch payloads are stored in the load queues 138 and store queues 140 as needed, the core processing unit 105 executes the micro-ops. The load queues 138 and store queues 140 return data for the load micro-ops and perform writes for store micro-ops, respectively. For other types of operations the scheduler 151 and the scheduler 172 issue micro-ops to the integer scheduler and/or execution unit 130 and floating-point scheduler and/or execution unit 132 as their respective sources become ready.

As will be discussed in greater detail herein below decoder 126, physical register file 160 and LS unit 139 are communicatively coupled.

Figure 2:
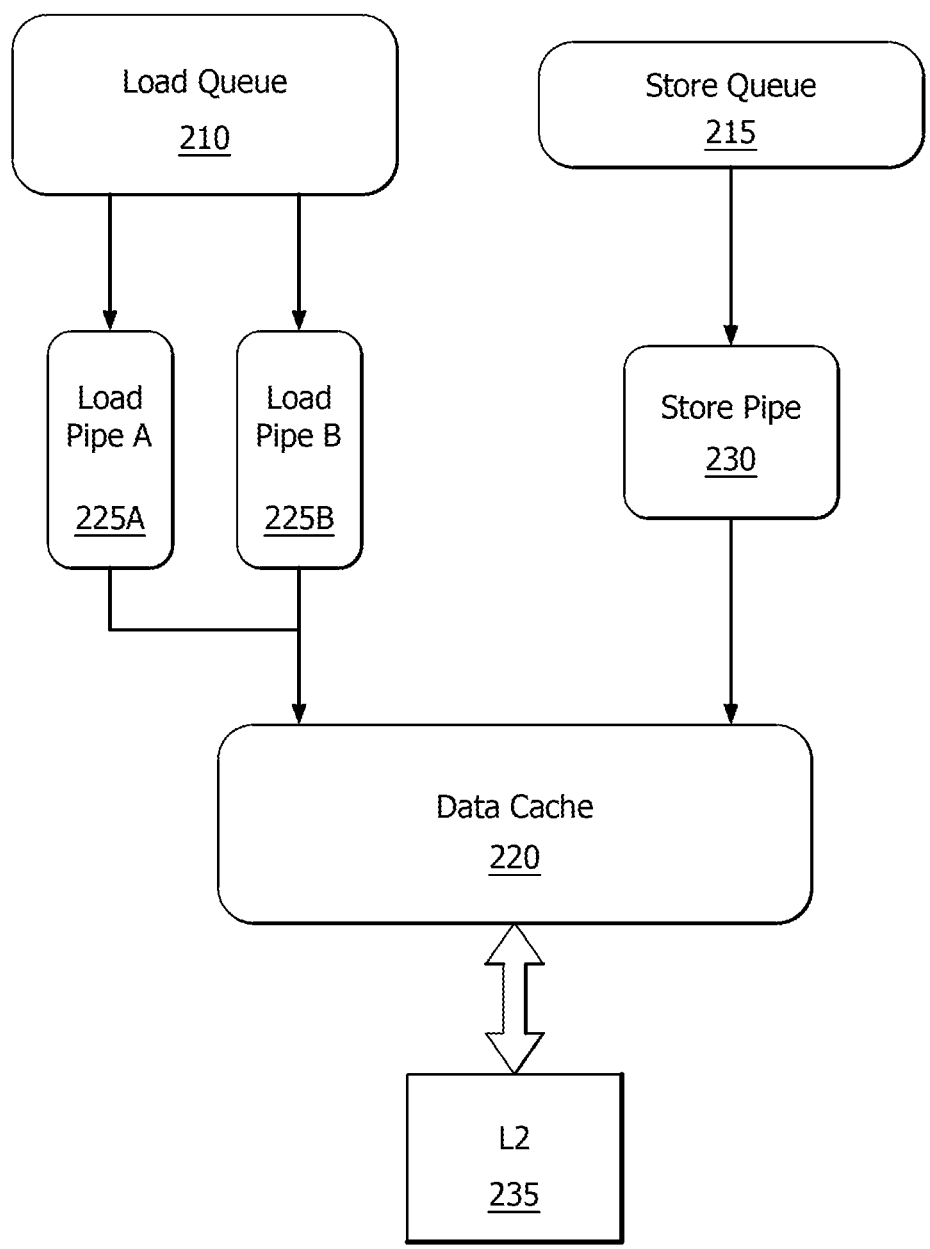
FIG. 2 illustrates a load store (LS) unit for handling data access within the core processing unit of FIG. 1.

FIG. 2 illustrates load store (LS) unit 139 for handling data access within the processor 100. LS unit 139 includes a load queue 210 and a store queue 215, each operatively coupled to a data cache 220. The LS unit 139 is configured into pipelines, collectively 225 and 230, that are independent. In an implementation, the LS unit 139 includes three pipelines, collectively 225 and 230, enabling execution of two load memory operations 225A, 225B and one store memory operation 230 per cycle.

Load queue 210 of LS unit 139 includes a plurality of entries. In an implementation, load queue 210 includes 44 entries. Load queue 210 receives load operations at dispatch and loads leave load queue 210 when the load has completed and delivered data to the integer scheduler and/or execution unit 130 or the floating point scheduler and/or execution unit 132.

Store queue 215 includes a plurality of entries. In an implementation, store queue 215 includes 44 entries. Although this example is equal to the number of entries in the example load queue 210 above, an equal number of entries is not needed in load queue 210 and store queue 215. Store queue 215 holds stores from dispatch until the store data is written to data cache 220.

Data cache 220 caches data until storage in L2 235 is performed. Data cache 220 is a hardware or software component that stores data so future requests for that data can be served faster. Data stored in data cache 220 can be the result of an earlier computation, the duplicate of data stored elsewhere, or store data from store queue 215. L2 235 may be a slower and/or larger version of data cache 220.

LS unit 139 dynamically reorders operations, supporting both load operations using load queue 210 bypassing older loads and store operations using store queue 215 bypassing older non-conflicting stores. LS unit 139 ensures that the processor adheres to the architectural load/store ordering rules as defined by the system architecture of processor 100 via load queue 210 and store queue 215.

LS unit 139 supports store-to-load forwarding (STLF) when there is an older store that contains all of the load's bytes, and the store's data has been produced and is available in the store queue 215. The load from STLF does not require any particular alignment relative to the store as long as it is fully contained within the store.

In the computing system including processor 100, certain address bits are assigned to determine STLF eligibility. Importantly, the computer system avoids having multiple stores with the same address bits, destined for different addresses in process simultaneously. This is the case where a load may need STLF. Generally, loads that follow stores to similar address bits use the same registers and accesses are grouped closely together. This grouping avoids intervening modifications or writes to the register used by the store and load when possible. This allows LS unit 139 to track "in-flight" loads/stores. For example, the LS unit 139 may track "in-flight" cache misses.

LS unit 139 and the associated pipelines 225A, 225B, 230 are optimized for simple address generation modes. Base+displacement, base+index, and displacement-only addressing modes (regardless of displacement size) are considered simple addressing modes and achieve 4-cycle load-to-use integer load latency and 7-cycle load-to-use floating point (FP) load latency. Addressing modes where both an index and displacement are present, such as commonly used 3-source addressing modes with base+index+displacement, and any addressing mode utilizing a scaled index, such as ×2, ×4, or ×8 scales, are considered complex addressing modes and require an additional cycle of latency to compute the address. Complex addressing modes achieve a 5-cycle (integer)/8-cycle floating point load-to-use latency. Generally, these systems operate by avoiding complex, such as scaled-index, or index+displacement, addressing modes in latency-sensitive code.

Figure 3:
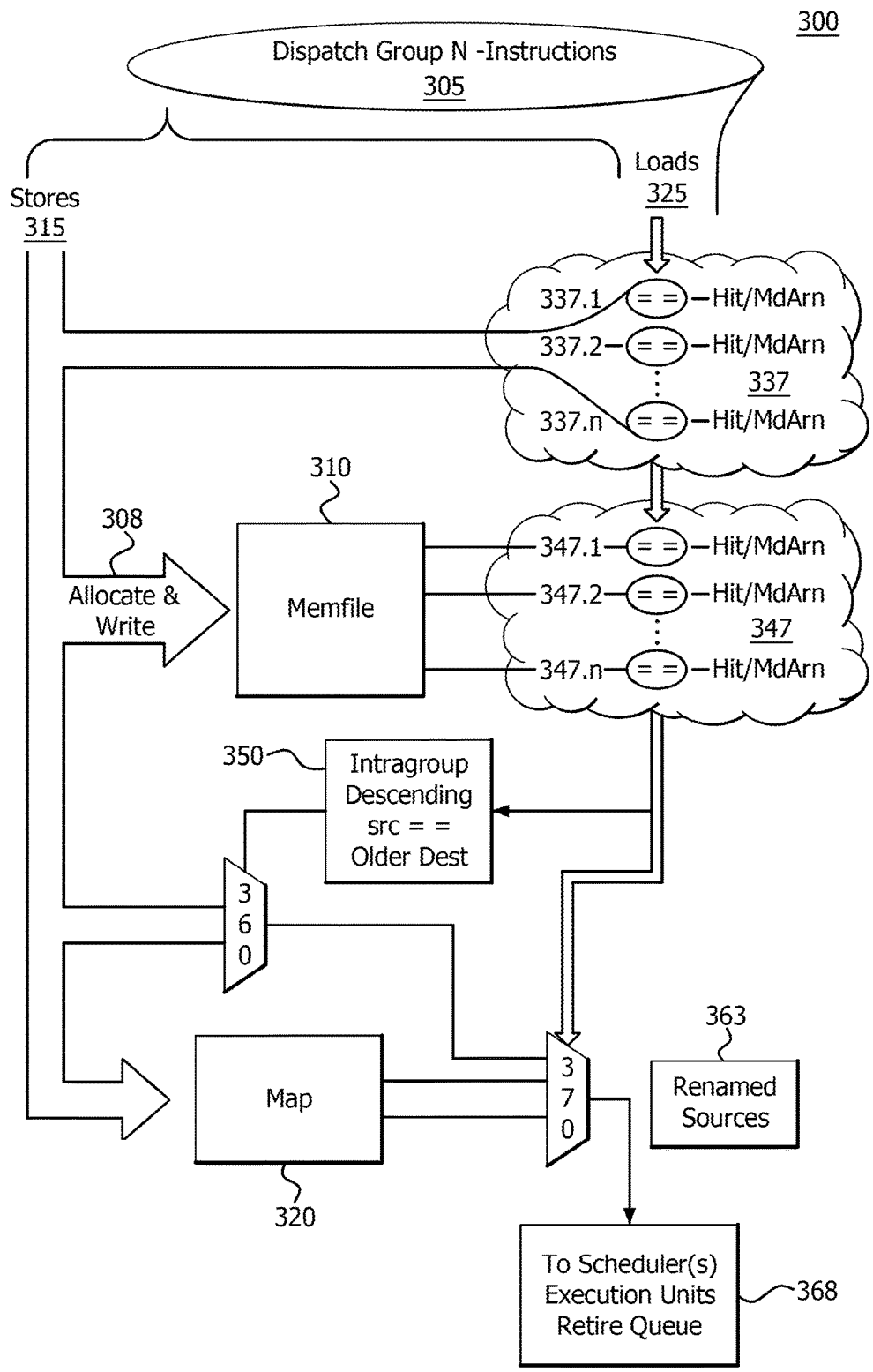
FIG. 3 illustrates a hardware flow of memory renaming in conjunction with LS unit within the core processing unit of FIG. 1.

FIG. 3 illustrates a hardware flow 300 of memory renaming in conjunction with LS unit 139 within the core processing unit 105 of FIG. 1. FIG. 3 shows the hardware flow 300 of tracking stores and loads by bypassing the LS unit 139. Specifically, memory renaming is the method for tracking stores and loads to the same address while bypassing the LS unit 139 when a load follows an associated store. Memory renaming is used to optimize the forwarding of data from store to load. The use of memory renaming generally operates without involving the resources of LS unit 139. In essence, memory renaming enables data to be "remembered" in integer scheduler and/or execution unit 130 and floating point scheduler and/or execution unit 132.

In general, in order to enable the "remembering", micro architectural registers that are memory dependent architectural register numbers (MdArns) are utilized. The MdArns serve as the location for "remembering" data that has been stored to be used on a subsequent load. The MdArns are utilized even though the data is also stored in traditional memory stores. The traditional memory stores occur through the LS unit 139. MdArns are architectural register numbers that are a part of and accessible to integer renamer 150 and/or floating point renamer 170 shown in FIG. 1. This allows integer renamer 150 and/or floating point renamer 170 to load data from an MdArn ("remembering") without the need to request the data from the LS unit.

In an implementation, the information regarding the MdArns is stored in a map 320. Map 320 is a file that includes the MdArn map, which provides the map to what has been stored in specific MdArns. The MdArns are not architecturally visible and are only used internally for memory dependent renaming. Specifically, each entry in map 320 contains a physical register number (PRN) which is an index of the physical register file (PRF) 160,178 where the given store data is written, in addition to being sent to the LS unit 139. Map 320 enables store data to be forwarded locally to loads and load dependents through renaming using the associated store's MdArn. There are N number of MdArns.

Hardware flow 300 illustrates the dispatching of N-instructions 305. The N-instructions instructions 305 are stored as described above with respect to FIGS. 1 and 2. In addition to the storing process detailed in those figures, stores 315 also use MdArns including a plurality of individual MdArns 337.1, 337.2 . . . 337.n. While FIG. 3 illustrates dispatching N number of MdArns in map 320, the number of intergroup dependencies is constrained by the number of operations that are dispatched simultaneously, such as 6 operations in a 6-wide architecture, for example. Address information for any stores 315 in the current dispatch group are written 308 into the MEMFILE 310 within the decode unit 110, assigned an MdArn, and renamer 150,170 to map it to a free PRN, storing it in the map 320 just as is done with mapped ARNs. If there are multiple stores to the same address within a dispatch group, only the oldest store is stored in the MEMFILE 310 and renamed to an MdArn. MEMFILE 310 is an in-memory file cache.

Older stores are defined by program order. Within a common dispatch grouping, operations are in program order. Intergroup dependencies are checked to ensure the correct source. The oldest operation is not dependent on any of the younger operations. For example, the second oldest operation can be dependent on the oldest operation while the youngest operation can be dependent on any of its older operations.

Stores 315 are allocated and written 308 to MEMFILE 310 and identified in map 320. As stores 315 are directed to MEMFILE 310 and identified in map 320, they are also compared against dispatch loads 325 for address matches, as shown in 337 (337.1, 337.2 . . . 337.n). Additionally, dispatched loads 325 are checked for address matches against stores previously written in the MEMFILE 310, depicted in 347 (347.1, 347.2 . . . 347.n). Loads 325 whose address match a store in compare logic 337 and 347 are associated with the given store, undergo intergroup dependency checking (350,360,370), and are then mapped to the PRN denoted by the stores MdArn.

In an implementation, scheduler and/or execution unit 115 monitors each store 315, in order, in the MEMFILE 310, which is within the decoder 126. In short, in an implementation, the MEMFILE 310 is an age ordered rotating first-in, first-out (FIFO) allocated with each store 315 that is dispatched. Dispatch is when instructions have been decoded and are sent to the renamer and scheduling queues (363, 368), such as between micro-op queue 128 and renamer 150 (in the case of the integer renamer). Each entry within MEMFILE 310 contains information about the store 315, such as the base and index registers within physical register file 160 and includes part of the displacement. This store 315 gets allocated an MdArn, of which there are N, in a rotating manner.

In scheduler and/or execution unit 115, the stores 315 operate as described herein above with respect to FIGS. 1 and 2. The store 315 splits into an address generation component and a store 315 data movement to LS unit 139. For memory renaming, the store 315 also includes moving the store data to the MdArn. During store data movement to the LS unit 139, the physical register file 160 is written for the PRN allocated to that MdArn in map 320.

Memory renaming reduces STLF latency by changing it to a register-to-register move. A subset of operations could additionally be combined with move elimination to be accomplished in mapping only, reducing STLF to zero cycle latency.

If the load 325 is a load-operation or a pure-load, the operand that would normally come from memory, such as cache 134 or L2 136, or other memory, for example, is instead provided by MdArn. The load 325 executes an address generation and LS unit 139 verifies the correctness of the memory renaming flow 300. LS unit 139 abstains from returning data. Additionally, the LS unit 139 checks that there have been no intermediate stores to the given address which breaks the renamed store-load association. If verification fails, LS unit 139 resynchronizes load 325 by re-performing load 325. The resynchronizing of load 325 includes re-performing all of the work that has been performed, flushing the pipeline and starting the execution from scratch beginning with the load.

Figure 4:
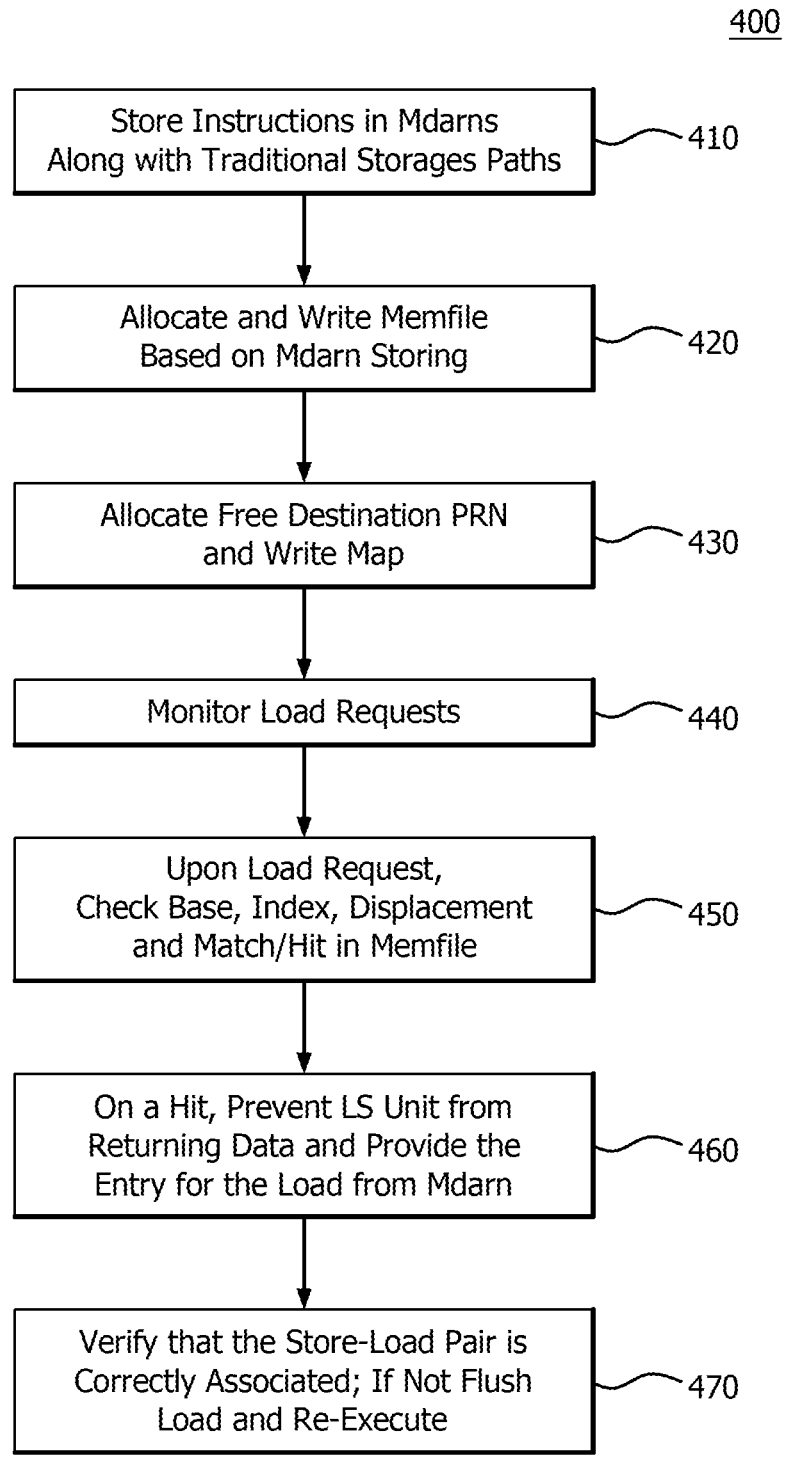
FIG. 4 illustrates a method for memory renaming in conjunction with LS unit within the core processing unit of FIG. 1.

FIG. 4 illustrates a method 400 for memory renaming in conjunction with LS unit 139 within the core processing unit 105 of FIG. 1. Method 400 includes storing instructions in MdArns along with the traditional storage path at step 410. At step 420, method 400 allocates and writes to a MEMFILE 310 based on MdArn storage. The free destination PRN is allocated to be used and a map is written at step 430. The system monitors load requests at step 440. Upon on a load request, the base, index, displacement and match/hit in MEMFILE 310 are checked within the dispatch logic where MEMFILE 310 resides, such as between micro-op queue 128 and map 320 (within renamer 150 as discussed) at step 450. On a hit, the LS unit 139 is prevented from returning data and provides the entry for the load from MdArn identified from MEMFILE at step 460. At step 470, the LS unit 139 verifies that the store-load pair is correctly associated. If it is not, the load is flushed and re-executed.

Figure 5:
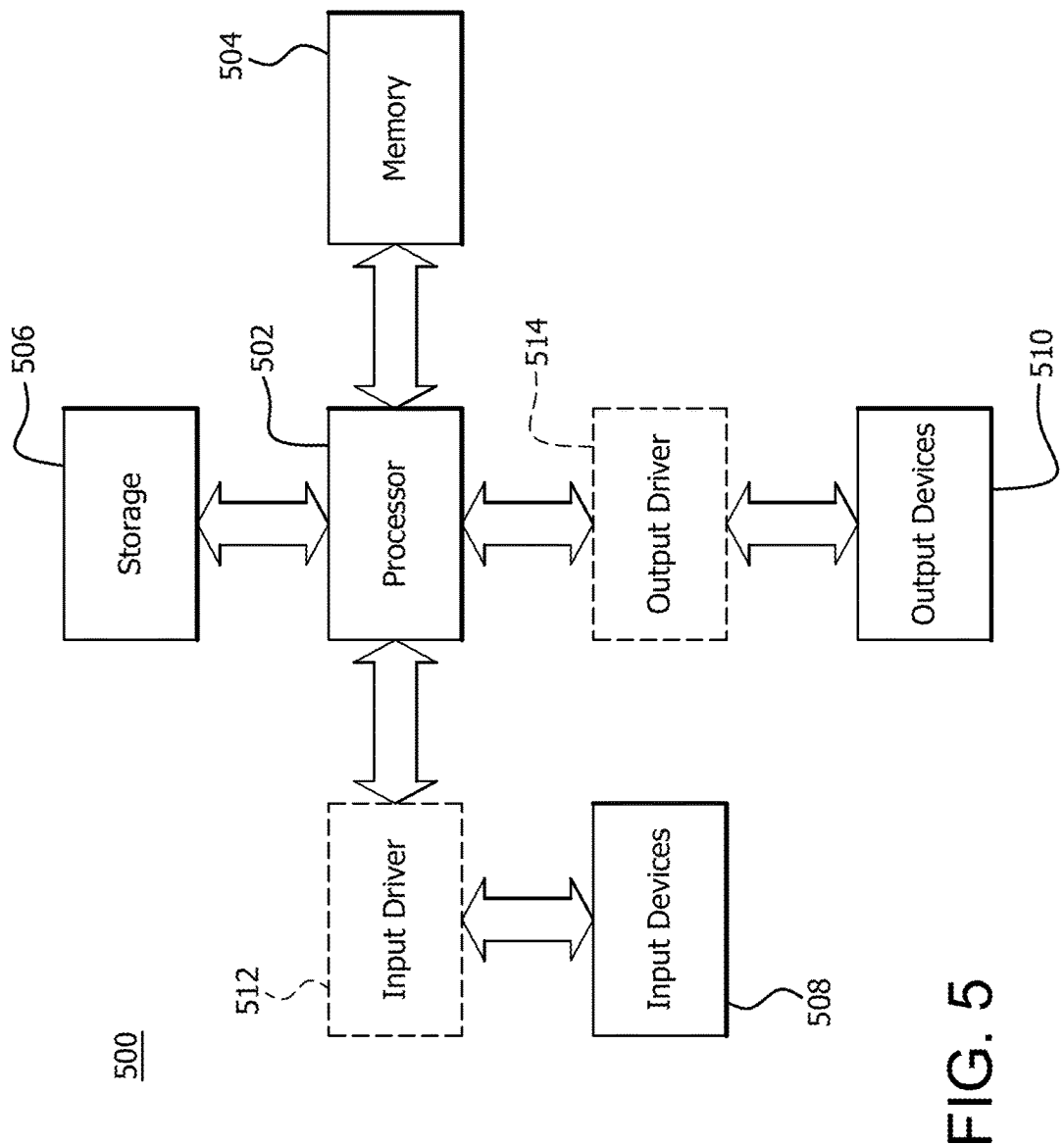
FIG. 5 illustrates a diagram of an example device in which one or more portions of one or more disclosed examples may be implemented.

FIG. 5 illustrates a diagram of an example device 500 in which one or more portions of one or more disclosed examples may be implemented. The device 500 may include, for example, a head mounted device, a server, a computer, a gaming device, a handheld device, a set-top box, a television, a mobile phone, or a tablet computer. The device 500 includes a compute node or processor 502, a memory 504, a storage 506, one or more input devices 508, and one or more output devices 510. The device 500 may also optionally include an input driver 512 and an output driver 514. It is understood that the device 500 may include additional components not shown in FIG. 5.

The compute node or processor 502 may include a central processing unit (CPU), a graphics processing unit (GPU), a CPU and GPU located on the same die, or one or more processor cores, wherein each processor core may be a CPU or a GPU. The memory 504 may be located on the same die as the compute node or processor 502, or may be located separately from the compute node or processor 502. The memory 504 may include a volatile or non-volatile memory, for example, random access memory (RAM), dynamic RAM, or a cache.

The storage 506 may include a fixed or removable storage, for example, a hard disk drive, a solid state drive, an optical disk, or a flash drive. The input devices 508 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 510 may include a display, a speaker, a printer, a haptic feedback device, one or more lights, an antenna, or a network connection (e.g., a wireless local area network card for transmission and/or reception of wireless IEEE 802 signals).

The input driver 512 communicates with the compute node or processor 502 and the input devices 508, and permits the compute node or processor 502 to receive input from the input devices 508. The output driver 514 communicates with the compute node or processor 502 and the output devices 510, and permits the processor 502 to send output to the output devices 510. It is noted that the input driver 512 and the output driver 514 are optional components, and that the device 500 will operate in the same manner if the input driver 512 and the output driver 514 are not present.

In general and without limiting embodiments described herein, a computer readable non-transitory medium including instructions which when executed in a processing system cause the processing system to execute a method for load and store allocations at address generation time.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for tracking stores and loads to reduce load latency when storing and loading from a same memory address by bypassing a load store (LS) unit within an execution unit, the method comprising:
   storing data in one or more memory dependent architectural register numbers (MdArns);
   allocating the one or more MdArns to an in-memory file cache;

writing the allocated one or more MdArns to a file, wherein the file contains a MdArn map to enable subsequent access to an entry in the in-memory file cache;

upon receipt of a load request, checking a base, an index, a displacement and a match/hit via the file to identify, via the one or more MdArns, an entry in the in-memory file cache and an associated store; and on a hit, providing the entry responsive to the load request from the one or more MdArns by bypassing the LS unit.

2. The method of claim 1 further comprising allocating a free destination in a physical register file (PRF).

3. The method of claim 1 further comprising on a hit, preventing the LS unit from returning data responsive to load request.

4. The method of claim 1 wherein the preventing occurs in a scheduler.

5. The method of claim 4 wherein the scheduler comprises an arithmetic logic unit (ALU) scheduler (ALSQ).

6. The method of claim 4 wherein the scheduler comprises an address generation unit (AGU) scheduler (AGSQ).

7. A system for tracking stores and loads to reduce load latency when storing and loading from a same memory address by bypassing a load store (LS) unit within an execution unit, the system comprising:

a plurality of memory dependent architectural register numbers (MdArns) for storing data;

an in-memory file cache for allocating the at least one of the plurality of MdArns; and a file for writing a MdArn map;

wherein upon receipt of a load request, checking a base, an index, a displacement and a match/hit via the file to identify, via the plurality of MdArns, an entry in the in-memory file cache and an associated store; and wherein on a hit, providing the entry responsive to the load request from the at least one of the plurality of MdArns by bypassing the LS unit.

8. The system of claim 7 further comprising a physical register file (PRF) to allocate a free destination.

9. The system of claim 7 further comprising on a hit, preventing the LS unit from returning data responsive to load request.

10. The system of claim 9 wherein the preventing is performed by a scheduler.

11. The system of claim 10 wherein the scheduler comprises an arithmetic logic unit (ALU) scheduler (ALSQ).

12. The system of claim 10 wherein the scheduler comprises an address generation unit (AGU) scheduler (AGSQ).

13. The system of claim 7 wherein the checking is performed by a scheduler and/or execution unit.

14. A non-transient computer readable medium containing program instructions for causing a computer to perform tracking stores and loads to reduce load latency when storing and loading from a same memory address by bypassing a load store (LS) unit within an execution unit, the method comprising:

storing data in one or more memory dependent architectural register numbers (MdArns);

allocating the one or more MdArns in an in-memory file cache;

writing the allocated one or more MdArns to a file, wherein the file contains a MdArn map to enable subsequent access to an entry in the in-memory file cache;

upon receipt of a load request, checking a base, an index, a displacement and a match/hit via the file to identify, via the one or more MdArns, an entry in the in-memory file cache and an associated store; and on a hit, providing the entry responsive to the load request from the one or more MdArns by bypassing the LS unit.

15. The computer readable medium of claim 14, the method further comprising allocating a free destination in a physical register file (PRF).

16. The computer readable medium of claim 14, the method further comprising on a hit, preventing the LS unit from returning data responsive to load request.

17. The computer readable medium of claim 16 wherein the preventing is performed by a scheduler.

18. The computer readable medium of claim 17 wherein the scheduler comprises an arithmetic logic unit (ALU) scheduler (ALSQ).

19. The computer readable medium of claim 17 wherein the scheduler comprises an address generation unit (AGU) scheduler (AGSQ).

20. The computer readable medium of claim 14 wherein the checking is performed by a scheduler and/or execution unit.

* * * * *